Dec. 27, 1955  R. S. POTTER  2,728,845
PHOTOGRAPHIC PRINTER
Filed Oct. 9, 1951
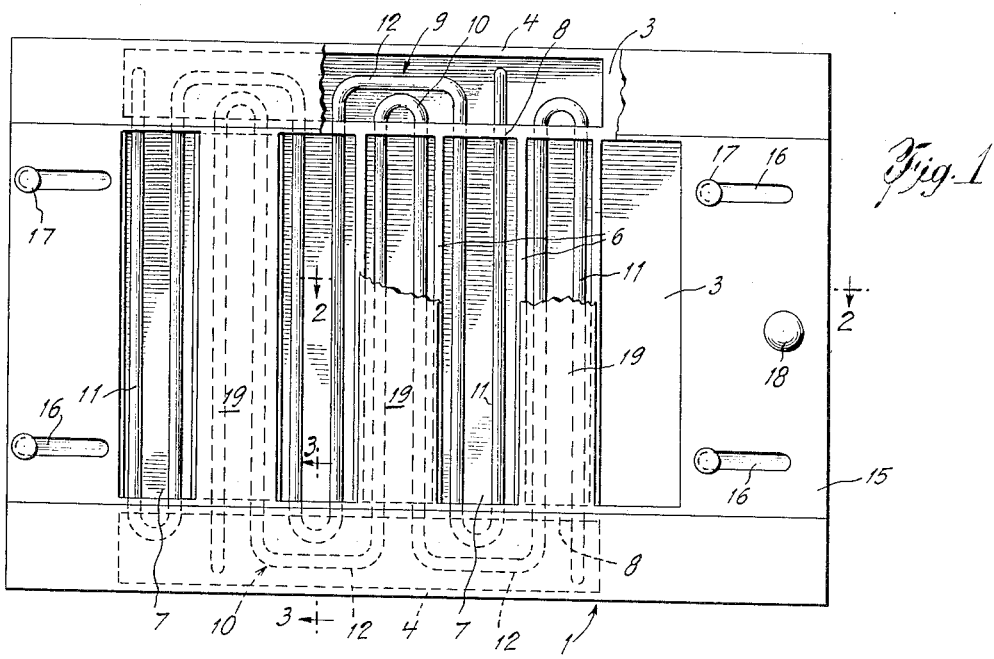
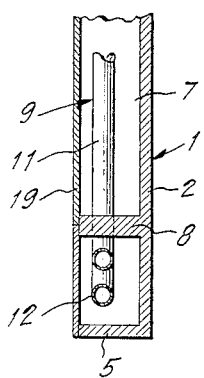
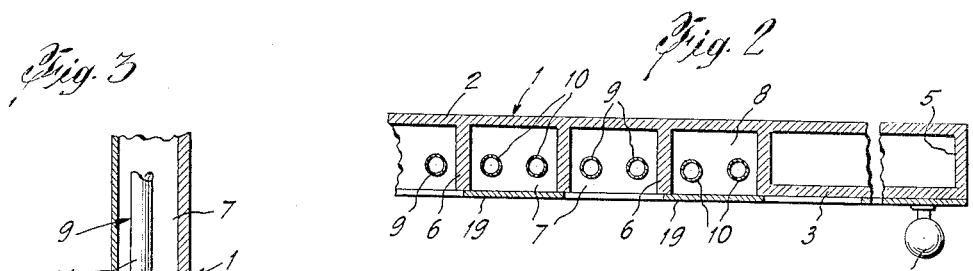
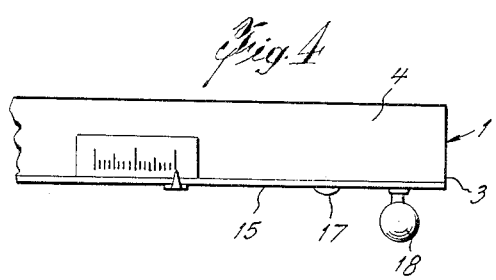
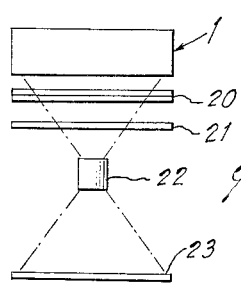
INVENTOR.
Rowland S. Potter.

2,728,845

PHOTOGRAPHIC PRINTER

Rowland S. Potter, Newton, N. J.

Application October 9, 1951, Serial No. 250,432

4 Claims. (Cl. 240—11.4)

This invention relates to photographic printers and enlargers, particularly to the light source and is intended for the control of the spectrally different light components (usually blue and green) for producing hard, soft and intermediate gradations in prints made on variable contrast papers such as that known as Varigam.

Variable contrast papers, such as Varigam, give so called hard gradation when exposed to blue light and soft gradation when exposed to green or yellow light. None of the hitherto suggested means of light control have been entirely satisfactory and it will be shown how the device to be described has great advantages and overcomes the difficulties encountered.

Heretofore, printers used two light filters, one blue and the other yellow and with the exposure made partly through one filter and partly through the other. Besides the difficulties inherent in the use of filters the disadvantages and inconvenience of this method are well known.

A set of filters (ten in the case of some commercial sets) ranging in color between blue and yellow have been made and are still in large use. Gelatin filters, even when carefully mounted are liable to damage by moisture, water spots, dust, finger marks, chemical splashes, fading and warping. Filters will also be lost and have to be put back in the container and changed whenever a change in gradation is desired. Additionally, critical users would often want a gradation between two filters. Since all filters are light absorptive in some degree in their region of transmittance, the blue to the extent of 75%, the blue filters would require prolonged exposure and it was not easy to make a well balanced set.

A set of ten glass filters is also available but these are expensive and suffer from some of the troubles inherent in the gelatin filters, especially the nuisance of changing filters.

It has been suggested in an earlier patent of the applicant, No. 2,392,502, dated January 8, 1946, to use a single light source and control the color of the output by a striated filter and shutter, but there again one is confronted with the troubles of filter inefficiency as pointed out above, as well as the small emission of blue in the tungsten lights usually used, thus requiring long exposures. Expense of manufacture was another deterrent. Single concentrated light sources give trouble with so called hot spots (central light concentration) and film negatives tend to warp from the heat.

It has been suggested to use blue and green fluorescent snake like lamps and to control their respective output by separate transformers and balanced rheostat control so that one tube will flow more brightly as the other decreases in brilliancy. This suffers from the necessary expense of two transformers and rheostats. Since all such tubes have a warm up period before constant output is obtained, there will be irregularities in ratios of brilliancies when one tube is turned on later than the other as will happen when proceeding from one extreme to the other, also further troubles are encountered such as flickering and lack of proportional response when only a small amount of current flows through one tube so that while it is easy to obtain the highest and lowest gradation and the middle ones it is difficult to obtain and control the steps close to the extremes.

All of the defects mentioned have been overcome by the present invention and other advantages will be apparent.

In the device hereinafter described in detail, two intermeshing grid shaped cold cathode fluorescent tubes are used, one fluorescing dominantly in the blue spectral region in which Varigam paper gives a high contrast and the other in the green in which a soft gradation is obtained. The folds or legs of the tubes are placed in a series of compartments so that each fold or U-shaped portion of one tube is separated by a light tight partition from the adjoining fold of the other color. In front of these compartments moves a shutter whose alternate open and closed areas are equal and of same area as one compartment face and movement is to the extent of one full compartment face. When, for example, the opaque areas are over the blue tube no blue light is emitted to the negative but all the green. As the shutter moves transversely to the compartments and light is emitted from the blue tube, a corresponding portion of the green is cut off. The result of this in practice provided the photographic intensity of the blue tube is balanced with the green, is that, as the shutter is moved across the tubes an absolutely steady change of gradation from hard to soft is obtained without any change of exposure.

In the drawing:

Fig. 1 is a bottom plan view of a housing mounting a pair of fluorescent light tubes and having shutter means adjustable thereon with portions broken way and illustrating details of construction.

Fig. 2 is a fragmentary vertical longitudinal cross section taken on line 2—2 of Fig. 1.

Fig. 3 is a fragmentary transverse cross section taken on line 3—3 of Fig. 1.

Fig. 4 shows a side elevation of a portion of the printer as shown in Fig. 1 to illustrate a scale and pointer adapted to indicate contrast control in finished print.

Fig. 5 is a diagrammatic view showing the relative arrangement of the invention with the diffusing means, the negative and the lens.

A housing 1 is provided for the printing light source. Housing 1 has back 2, front 3 extending about the marginal portions and mounted on the edges of side and end walls 4 and 5, respectively, and a plurality of partitions 6 dividing the housing into a plurality of light compartments 7 preferably arranged in pairs. Partitions 6 are perpendicular to back 2 and extend transversely in spaced parallel relation between inner side walls 8. Compartments 7 are open at the front. In the diagrammatic illustration of the invention, as shown in the drawing, these compartments are relatively long and narrow. An even number of compartments are shown so they can be used in pairs with a pair of fluorescent light tubes 9 and 10, respectively. Both tubes 9 and 10 are of duplicate construction, each having a plurality of U-shaped portions 11 with connecting portions 12 at the ends of portions 11 connecting the ends of adjacent U-shaped portions.

Tubes 9 and 10 are mounted in housing 1 with U-shaped portions 11 extending in opposite directions. Tubes 9 and 10 are arranged in coplanar relation in the housing, have the legs or narrow folds of each U-shaped portion each located in one of the compartments 7 to provide light emitting sections extending longitudinally in the compartments and having the end portions extending through apertures in inner side walls 8. The curved portion of each U-shaped portion 11 connecting the legs or light emitting sections, may or may not lie outside of compartments 7 between inner and outer side walls 8 and 4, respectively, as do the connecting portions 12, which are not used for light emission or projection. The tube portions lying outside of light compartments 7 may be coated with any suitable opaque coating or covering material to eliminate light emission, or light emission may be controlled by having the chambers between the inner and outer side walls tightly sealed to prevent light leakage when front 3 is in position on the housing.

The U-shaped portions 11 of tube 9 are mounted in alternate compartments 7 while portions 11 of tube 10 are mounted in alternate compartments 7 located intermediate the compartments receiving tube 9. With the use of two portions or one fold in each compartment 7, a striated light source is provided covering a desired area with substantial regularity which when diffused through diffusers constitutes a uniformly distributed light source for exposing.

Suitable shutter or control means is provided to control light projection from each of the tubes 9 and 10. A plate 15 is used having slots 16 formed in the end portions receiving studs 17 for slidably mounting the plate on the outer face of front 3. A handle 18 is mounted on plate 15 at one end so the plate may be manually adjusted in controlling light projection as hereinafter described. Plate 15 has a plurality of opaque shutter sections or blades 19 equal in length to the length of compartments 7 and having a width equal to the width of a compartment 7 and substantially the width of adjacent partitions so the margins of sections 19 will overlie, the free edges of the partitions at opposite sides of a compartment 7 in compartment covering position to prevent light projection and leakage therefrom. On opposite sides of sections or blades 19 plate 15 is formed with apertures equal in size to the open end of a compartment so that at either limit of movement of plate 15 of the control means alternate compartments 7 are open for full projection of light from one of the tubes.

The walls of housing 2 forming compartments 7 are preferably coated with light reflective material for increasing the efficiency of the useful light projected from each tube through the open ends of the compartments. The housing 1 may be coated on the outside with non-reflective material to eliminate stray light reflections when using the invention in enlarging and printing. Plate 15 may be coated with light reflective material to aid interface dispersion between plate 15 and diffusing plates. Light diffusing plates 20 may be placed in front of the housing in a manner well known in the art for diffusing the light projected outwardly from the open ends of the compartments. The negative 21 to be enlarged and printed is then placed in the light path in the usual manner and the focusing lens 22 arranged to focus the image on the sensitized paper 23 for producing an enlargement. The light diffusing plates efficiently cooperate with the striated fluorescent light source herein described to provide a substantially uniform light intensity of high efficiency.

The tubes employ phosphors having strong luminous emission in a narrow spectral range. The invention is particularly designed for printing on variable contrast papers, such as Varigam made by E. I. du Pont de Nemours & Co. These photographic papers produce a high contrast when exposed to blue light and a low contrast when exposed to green light. The tube 9 may be supplied with a blue phosphor and the tube 10 with a green phosphor. These tubes being primarily mercury areas will both emit the well known mercury spectral lines. This results in small emission from tube 9 in the green range of the spectrum above 5000 Angstrom units. A mercury line is produced at approximately 5461 Angstrom units which is undesired emission from tube 9. If this undesirable emission is important enough practically, it can be eliminated in tube 9 by coating the tube with a lacquer colored by a dye transparent to blue and opaque to the mercury line at 5461 and the other mercury leakage. Amacel Brilliant Blue B extra from American Aniline Products Inc. is satisfactory for this purpose, as is also Crystal violet AO or Ethyl violet AG of General Dye Stuffs Corp.

Tube 10 is supplied with a green phosphor and has a luminous glow between 5000 and 6000 Angstroms. A mercury line is produced in tube 10 at approximately 4047 and 4355 Angstroms. These mercury lines and any other spectrum leakage are eliminated from the projected light emission by applying a lacquer coating on tube 10 colored by a dye transparent to green and opaque to the mercury lines at 4047 and 4358 Angstroms. A satisfactory dye for this purpose is Iosol yellow made by National Aniline Division of Allied Chemical and Dye Corporation, and Celliton fast yellow 7G or 5GA from General Dye Stuffs Corp.

An increased luminous efficiency is obtained from tubes 9 and 10 when using single phosphors glowing in a limited spectral region as distinguished from fluorescent tubes whose phosphors glow over most of the spectrum. This results in providing a light source having a substantially higher luminous emission in the narrow ranges preferred in printing variable contrast papers as above described.

To repeat the advantages obtained by the present invention are:

1. Cool light source.
2. Uniform light intensity over negative area (freedom from so called hot spots).
3. No filters with all their troubles.
4. Maximum efficiency due to choice of phosphors glowing predominantly or entirely in desired spectrum regions.
5. Smooth mechanical control.
6. Absolutely any gradation from soft to hard can be obtained.
7. Equal exposure throughout the range.

By the manual adjustment of plate 15, one may print with either blue or green light while the other is obstructed, or very fine differences in color distribution with steepness of gradation may be obtained by adjusting plate 15 to allow the desired proportionate projection of both blue and green light. The pointer and scale shown in Fig. 4 may be provided on plate 15 and housing 1 for indicating gradation control.

If desired, only single tube portions may be used in each compartment, single compartments may be used for each color and any number or shape of compartments may be used for performing the present invention. Any shape of tube housing and compartment may be used in putting this invention into practice.

While a slide shutter has been described, other designs such as flap shutters could be used.

The invention claimed is:

1. A photographic contact or projection printer comprising as a light source, two fluorescent electric discharge tubes formed to glow in colors of different spectral regions, each tube being formed to provide a plurality of spaced light-emitting sections arranged side by side, sections of one tube alternating with sections of the other tube, a housing formed with a plurality of compartments each receiving and housing one of said spaced light-emitting sections, said housing having an opening in the same side of each compartment for projecting light in one direction from said housing, and shutter means operable to close the openings in alternate compartments and adjustable to vary the ratio of intensities of the light emitted from the source by each tube and also forming the only means of controlling the color of light projected from said source.

2. In a photographic printer as claimed in claim 1 wherein the housing has the plurality of compartments arranged in pairs, each of narrow elongated shape and in side by side parallel relation, a partition separating each compartment from the adjacent one having the free edges of all partitions lying in substantially the same plane, and said shutter means having a plurality of spaced parallel coplanar blades, one for each pair of compartments having a size sufficient to cover the opening in either compartment of a pair and overlap the adjacent free edges of the adjacent partitions.

3. In a photographic printer as claimed in claim 1 wherein the housing has the plurality of compartments arranged in pairs, each of narrow elongated shape and in side by side relation, a partition separating each compartment at the long sides thereof from the adjacent compartments having free edges terminating in substantially coplanar relation, each of said tubes having sections extending longitudinally through a plurality of said compartments in alternate relation, one tube having the sections thereof in a plurality of compartments arranged intermediate those of the other tube, each tube having portions connecting said sections lying outside of said compartments, and means opaque to light transmission covering said tube portions outside of said compartments.

4. In a photographic printer as claimed in claim 1 wherein the housing has the plurality of compartments arranged in pairs, each of narrow elongated shape and in side by side relation, a partition separating each compartment at the long sides thereof from the adjacent compartments having free edges terminating in substantially coplanar relation and each of said tubes having a pair of sections extending longitudinally in alternately arranged compartments to form a pair of striated interspersed sources of light for substantially uniform projection over a desired area.

References Cited in the file of this patent

UNITED STATES PATENTS

| | | |
|---|---|---|
| 1,784,171 | Bertling | Dec. 9, 1930 |
| 2,009,223 | Ewest | July 23, 1935 |
| 2,213,382 | Busse | Sept. 3, 1940 |
| 2,346,988 | Noel | Apr. 18, 1944 |
| 2,392,502 | Potter | Jan. 8, 1946 |
| 2,394,966 | Floyd | Feb. 12, 1946 |
| 2,524,657 | Ford | Oct. 3, 1950 |

FOREIGN PATENTS

| | | |
|---|---|---|
| 298,523 | Great Britain | Oct. 8, 1928 |